United States Patent [19]

Cousin

[11] 3,731,342
[45] May 8, 1973

[54] ARTICULATION FOR ADJUSTMENT OF INCLINATION OF A SEAT BACK REST ESPECIALLY FOR MOTOR VEHICLE SEATS

[75] Inventor: Maurice Claude Cousin, Orne, France

[73] Assignee: A. & M. Cousin et Cie, Etablissements Cousin Freres, Orne, France

[22] Filed: Aug. 6, 1971

[21] Appl. No.: 169,659

[30] Foreign Application Priority Data

Aug. 6, 1970 France....................7029061

[52] U.S. Cl. ..................16/144, 16/141, 297/365, 297/379
[51] Int. Cl. ...........................E05d 11/10
[58] Field of Search..................297/363, 364, 365, 297/373, 379, 367, 374, 355; 16/141, 144, 139

[56] References Cited

UNITED STATES PATENTS

| 906,380 | 12/1908 | Caley et al.............................16/141 |
| 1,159,529 | 11/1915 | Parizek...................................16/141 |
| 3,099,485 | 7/1963 | Beierbach............................297/373 |
| 3,328,079 | 6/1967 | Byczkowski.........................297/373 |
| 3,401,979 | 9/1968 | Putsch.............................297/366 X |
| 3,423,785 | 1/1969 | Pickles.............................297/379 X |
| 3,501,198 | 3/1970 | Boyce..................................297/373 |
| 1,538,577 | 5/1925 | Murray..................................16/144 |

Primary Examiner—Francis K. Zugel
Attorney—Walter Becker

[57] ABSTRACT

Linkage for adjusting a seat back rest especially for motor vehicles characterized thereby that two bearing brackets or plates are provided on a bearing sleeve and have holes therewith in circular rows upon equal diameters, whereby the rows of holes relative to each other provide a difference of at least one hole and whereby one of the bearing brackets or plates carries one of the bolts axially slidably guiding a disc or plate and whereby the bolts are covered by a rotatable housing which operates together with a loose pivotal disc and running-off surface with a lateral shifting. A return guidance of the bolts is effected by the running-off surfaces and loose pivotal disc and effective from each individual bolt having elastic elements provided therewith in those holes engaged by the two bearing brackets or plates which are covered in sufficient measure so that the heads of the bolts can be received thereby.

13 Claims, 19 Drawing Figures

PATENTED MAY 8 1973

INVENTOR
Maurice Claude Cousin
BY
Walter Becker

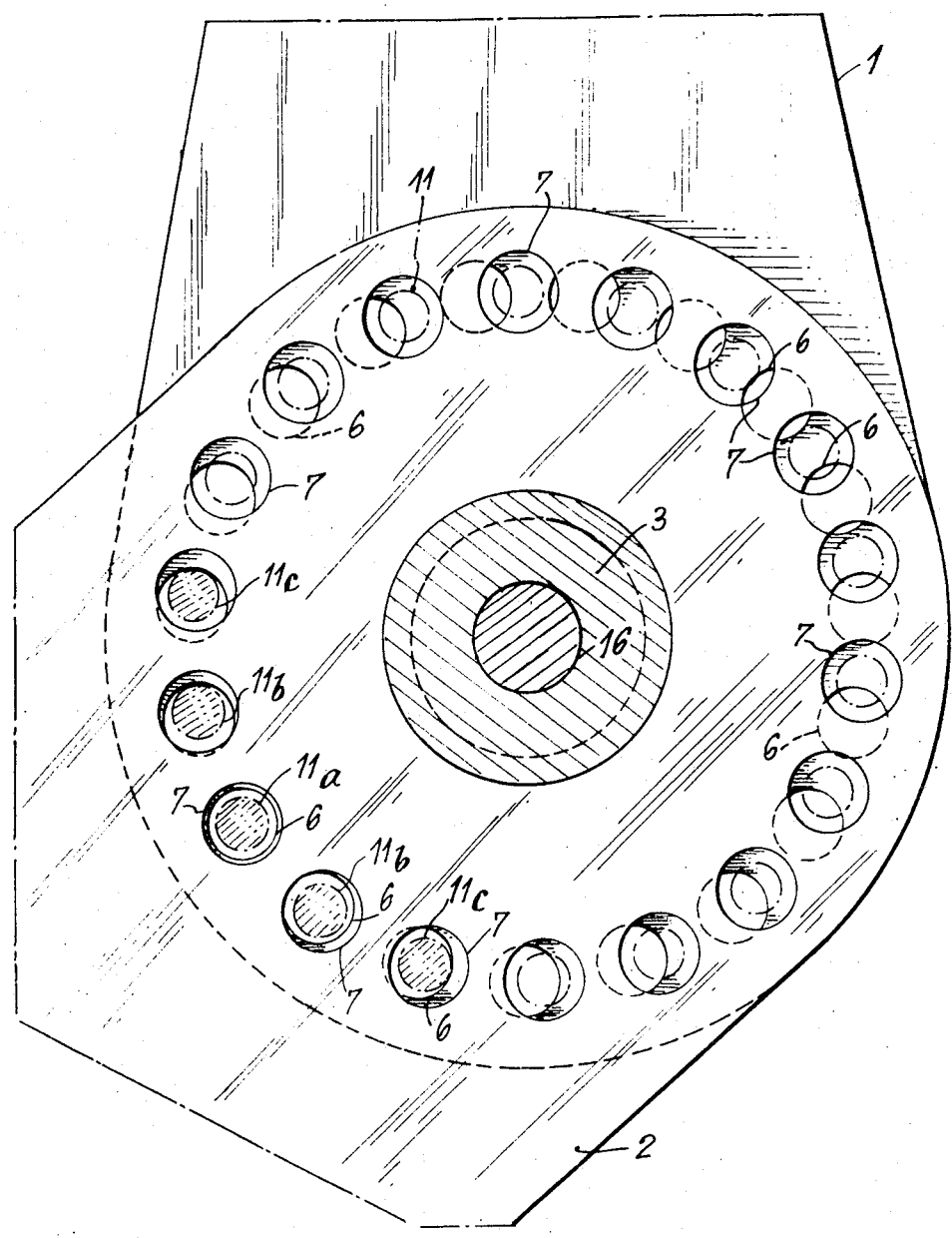

INVENTOR
Maurice Claude Cousin

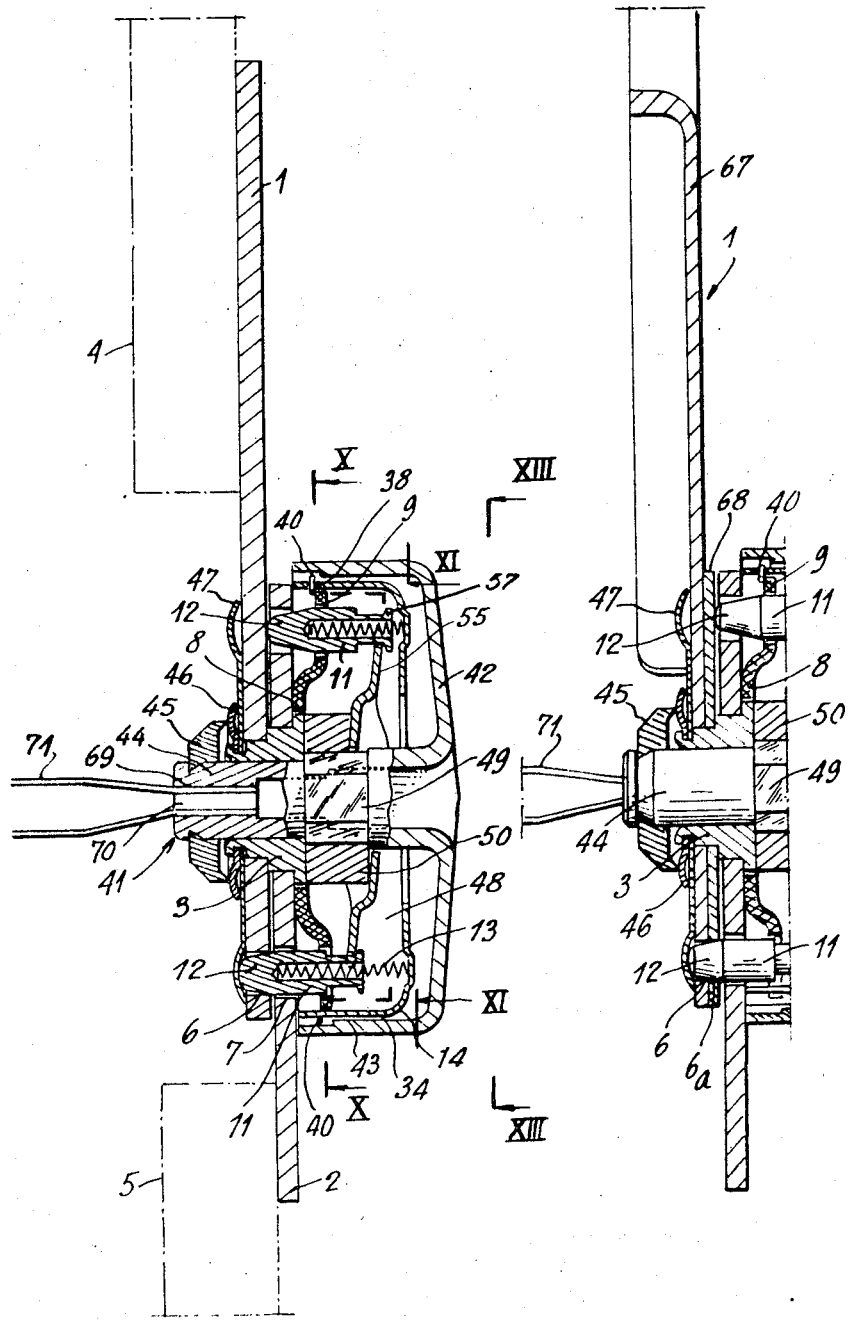

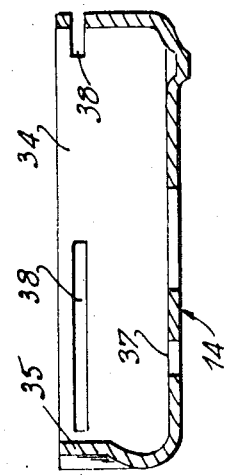
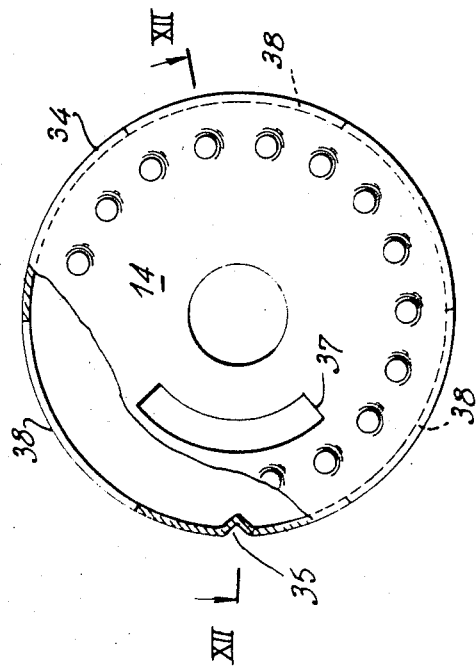
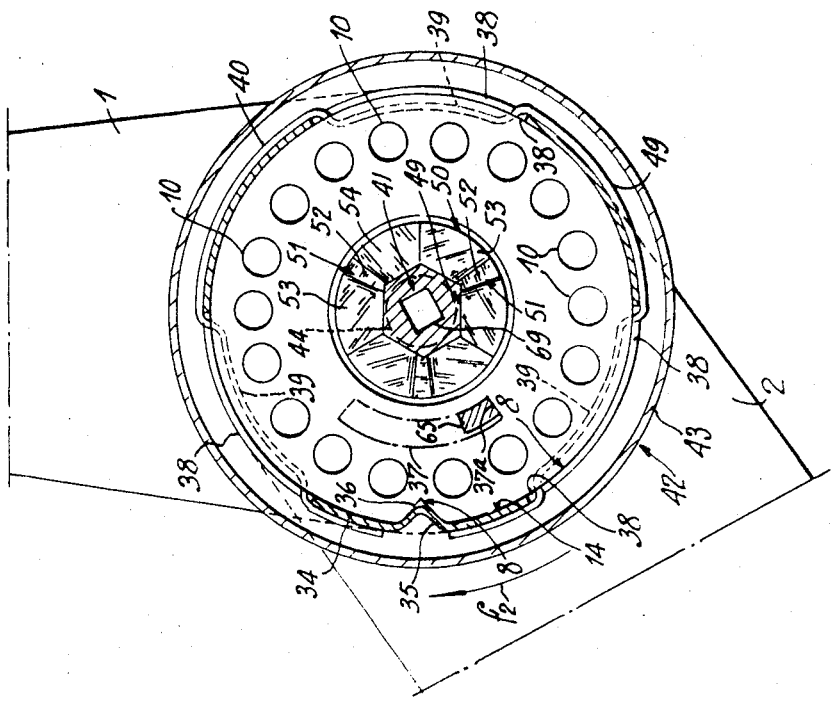

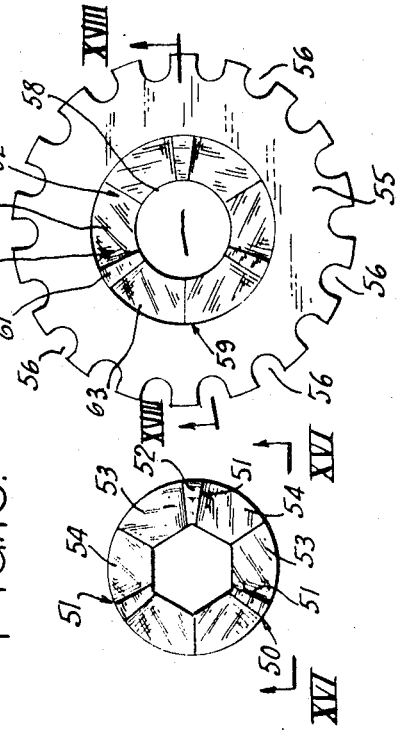
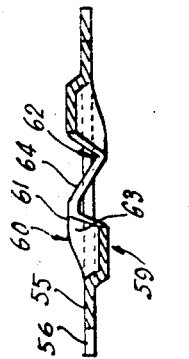
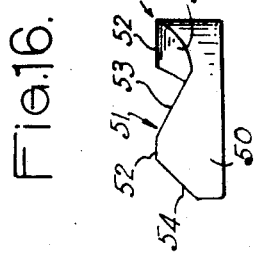
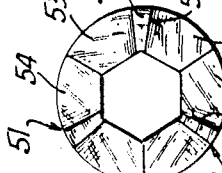
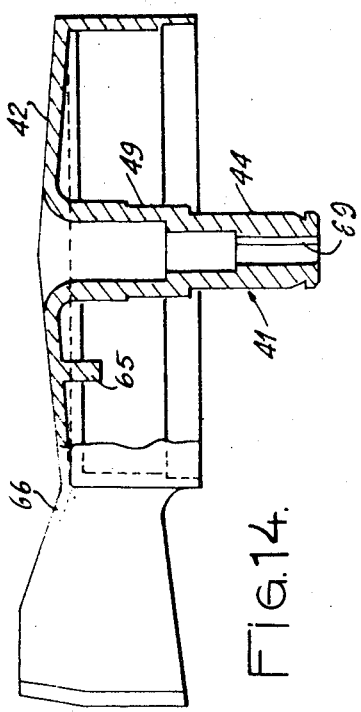
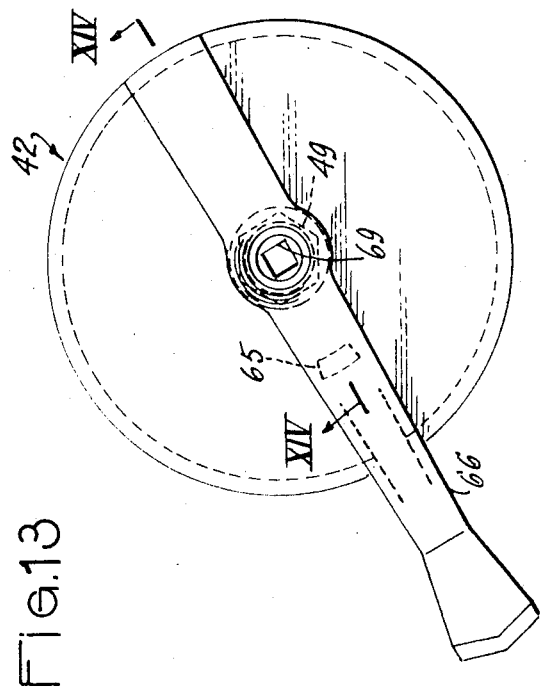

ns of each individual bolt having elastic elements provided therewith and that in sufficient measure are covered so that they can receive the heads of the bolts.

Various other features of the present invention will be apparent from the following detailed description.

Embodiments of the inventive teaching are not restricted as to protective scope by the examples given in the accompanying drawings.

In the drawings:

FIG. 3 is a partial side view in larger scale in essence along line III—III in FIG. 2.

FIG. 9 is a partially broken-away segmental view of a modification of the inventive linkage.

FIG. 10 is a section in essence along line X—X in FIG. 9.

FIG. 11 is a partial broken-away side view along line XI—XI in FIG. 9.

FIG. 12 is a middle or center section along line XII—XII in FIG. 11.

FIG. 13 is a side view along line XIII—XIII in FIG. 9.

FIG. 14 is a partial-center section along line XIV—XIV in FIG. 13.

FIG. 15 shows a side view of a special embodiment of one of the essential elements of the linkage.

FIG. 16 is a side view along line XVI—XVI in FIG. 15.

FIG. 17 is a side view of another essential element of the linkage.

FIG. 18 is a middle section along line XVIII—XVIII in FIG. 17.

FIG. 19 shows a modification of the linkage embodiment in a partial section.

Figure 1:
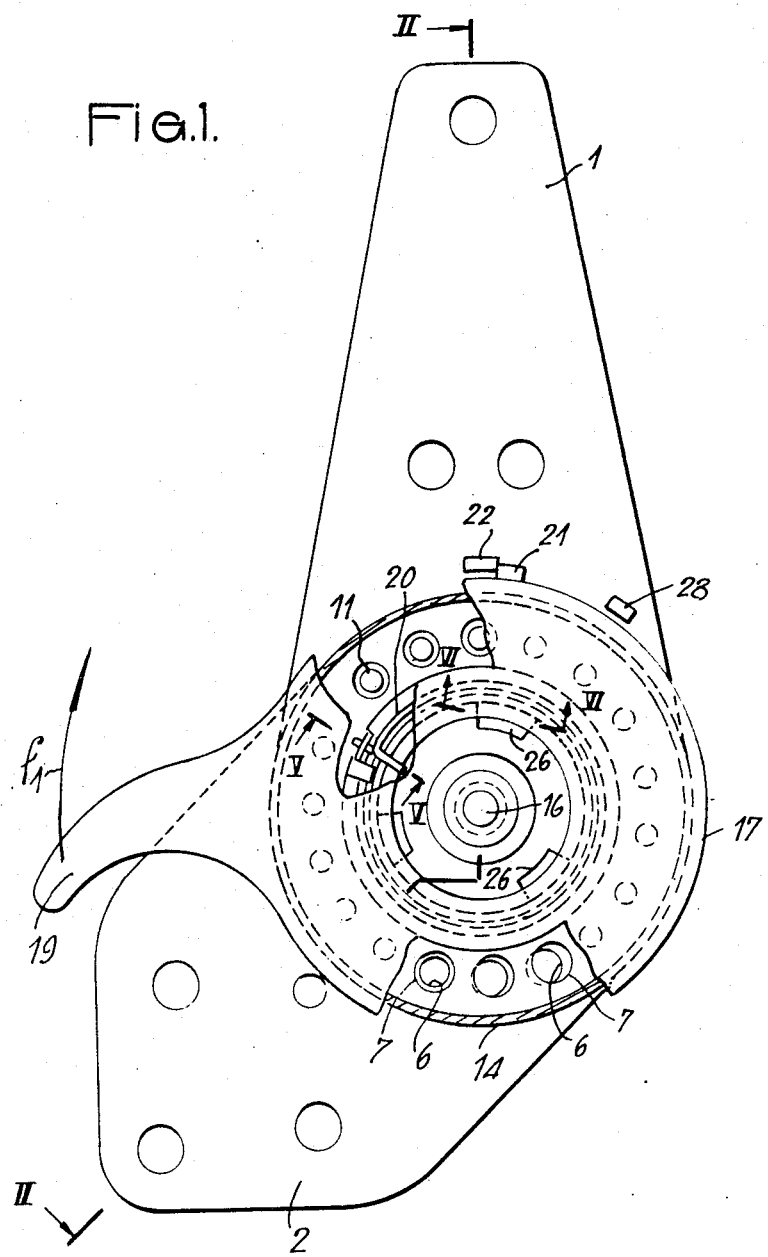
FIG. 1 is a partially broken-away side view of linkage in accordance with the present invention.
Figure 2:
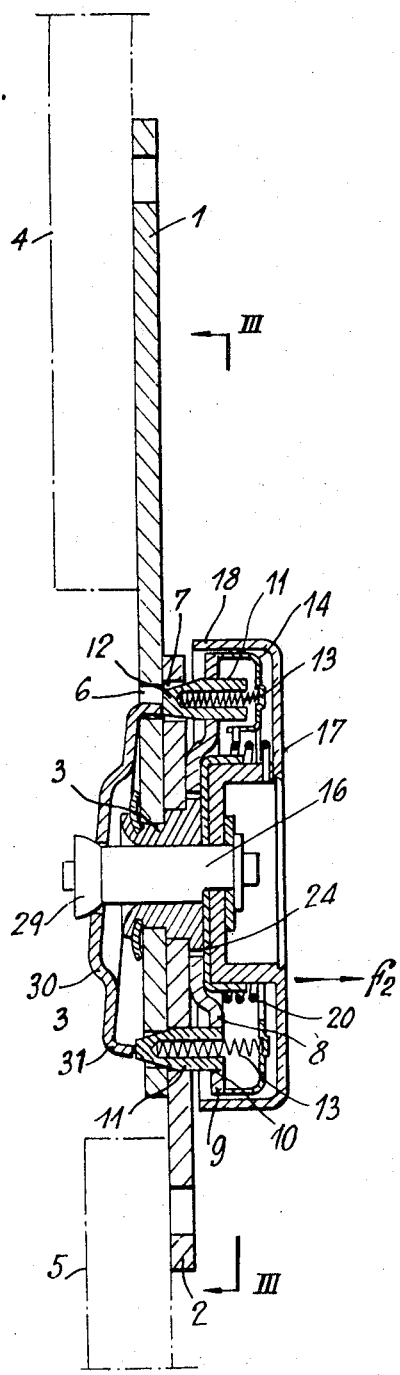
FIG. 2 is a section along line II—II in FIG. 1.

According to FIGS. 1 and 2, the linkage provides two bearing brackets 1 and 2 which are provided or mounted upon a common bearing sleeve 3. The brackets 1 and 2 are secured upon carriers or supports 4, respectively 5 of the back rest respectively of the seat.

The brackets 1 and 2 have two rows of holes 6 and 7 lying upon equal diameters and which have equal angular spacing therebetween and which are so arranged that the rows of holes relative to each other provide a difference of at least one hole. The bracket 1 includes for instance 19 holes and the bracket 2 includes for instance 18 holes.

The bracket 2 on the side thereof having a surface toward the bracket 1 carries a disc or plate 8 which forms a laterally offset ring-formed bearing surface 9 and which provides holes 10 which are arranged upon the same diameter as the holes 7. Cylindrical-spherically-blunted-formed studs or bolts 11 are guided in the

ARTICULATION FOR ADJUSTMENT OF INCLINATION OF A SEAT BACK REST ESPECIALLY FOR MOTOR VEHICLE SEATS

The present invention concerns angular adjustment of pivotal parts. The linkage has two bearing brackets of which each provides a row of holes and of which one bearing bracket carries a disc having guiding passages or bolts. The bolts are subjected to effectiveness of elastic forces so that the bolts can protrude into holes of the bearing bracket means providing inclined surfaces for shifting of a housing which is arranged relative to a swinging disc. Utilization of this structure is made for setting or adjusting a carrier for the back rest of a seat.

For improvement of comfort of occupants of a vehicle, especially an automobile, one can provide a linkage between the carriers of the seat means and the back rest. A manually operable mechanism belongs thereto which permits setting or adjustment of the inclination of the back rest carrier in a desired position. The linkages manufactured for this purpose provide adjustment mechanism of differing type with tooth segment, fitting pieces, rollers or supporting cylinder means which can be released by way of actuation of an elastically returnable lever over a relatively small angular range.

Differing arrangements previously known do not fully satisfy the requirements encountered because the same are generally bulky and susceptible to breakage. Additionally, most of these arrangements do not permit stepless adjustment and latching of the back rest carrier in any angular position between the end settings.

In order to confront these disadvantages there is disclosed a replacement of the above adjusting arrangements by way of one or more toothed wheel drives or by way of similar transfer or transmission means which are driven by way of a rotatable button. Even though such mechanisms may make possible the stepless adjustment and the latching in every desired angular position of the back rest carrier, they also force one using the same to make many turns with the turning button or knob, even if only a relatively small angular adjustment of the back rest carrier is to be achieved.

The present invention aids in overcoming the foregoing disadvantages in that there is provided a compact and resistance capable linkage for adjusting the inclination of the back rest of a seat. This is brought about by a small angular adjustment of a drive lever to attain an exact and stepless fine setting of the back rest inclination as well as achieving an effective latching in every position between the abutments for the steepest raising and the complete lowering thereof.

According to the present invention, the linkage for adjusting the inclination of a back rest of a seat especially for a motor vehicle seat, is characterized thereby that two bearing brackets are mounted on a bearing sleeve upon equal diameters carrying holes in circular rows, whereby the rows of holes of the brackets relative to each other provide a difference of at least one hole, and whereby one of the bearing brackets carries an axially slidable bolt guiding a disc, and whereby the bolts are covered by a rotatable housing which cooperates with side shifting served by running surfaces for this purpose and cooperating with a loose swinging disc that effects return guiding of those bolts which engage in those holes of both bearing brackets under effective-holes 10 and the heads 12 thereof engage in the holes 7 undereffectiveness of the springs 13. The springs 13 are arranged between these bolts and a cover or lid 14 which is securely connected with the disc or plate 8.

As can be seen from FIG. 3, the consequence of the difference in the number of holes 6 and 7 is that with desired angular setting of the brackets 1 and 2 relative to each other there is covering of certain holes 6 and 7 relative to each other so that the corresponding bolts are not pushed forward under effectiveness of spring means 13 through the corresponding holes 7 until at least partial penetration thereof into the complementary located holes 6. With the illustrated example, there is covering of five holes 6 sufficiently with the corresponding holes 7 so that the same both permit partial engagement of five bolts 11. These accordingly assure the latching of the angular setting between the bracket 1 and the bracket 2.

Figure 4:
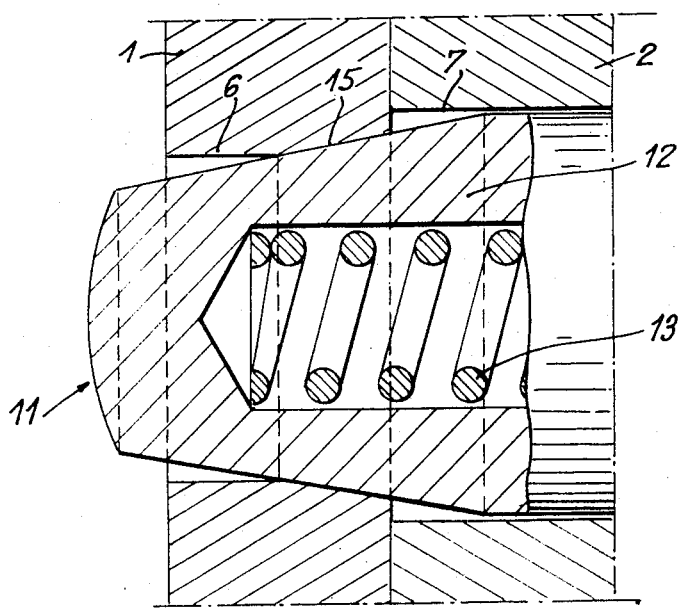
FIG. 4 is a partial section in larger scale of detailed embodiment of certain essential elements of the linkage.

The illustration of FIG. 3 shows that of the five bolts or studs put into actuation only the middle one thereof designated by 11a meets exactly with the corresponding hole 6 into which the same can penetrate as far as to a greatest depth while the studs or bolts 11b and 11c located on both sides of this stud or bolt 11a can penetrate only partially into mating relationship with the corresponding holes and the same consequently only penetrate in a corresponding measure in a freed or cleared through-passage cross section. So that the five bolts taken into actuation for example will effectively latch the linkage in the angular setting thereof, every spherically blunted-form head means 12 is conically formed so that the approximate middle diameter thereof corresponds to the transitional zone between the hole 6 and a spherical seat 15 (FIG. 4), the large base surface of which lies in the engaging surface of the bracket 1 against the upper surface of the bracket 2. In this manner, even with only partial covering of the spherical-blunted-form head means 12 there is sufficiently far penetration thereof into the inner part of the spherical seat 15 of the corresponding hole 6.

FIG. 3 shows a special situation in which the latching of the brackets 1 and 2 is effected by means of five bolts 11 in the corresponding angular position. There exists however, also a second case in which two of the holes 6 and 7 can be considered as covering themselves completely without also having exactly the same axis position. In such a case there occurs a latching of the brackets 1 and 2 in their angular position achieved only by means of four bolts 11.

Figure 5:
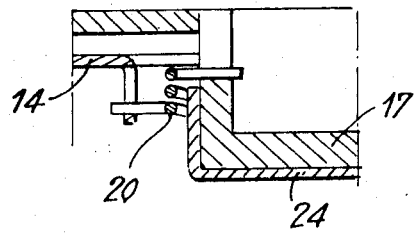
FIGS. 5 and 6 are partial sections in larger scale along lines V—V respectively VI—VI of FIG. 1.

The bearing sleeve 3 includes an axis or axle 16 of which an end part projects over the planar portion of the plate or disc 8 and carries a housing 17 having a cover 14 and an edge 18 surrounding the plate or disc 8. The housing 17 is secured thereto at an angle to the axis or axle 16 and forms a finger 19 on its periphery. A ring space or an annular chamber is boundaried thereby together with the disc or plate 8 and a spiral spring 20 is accommodated or positioned in this chamber or space. The end spirals thereof are anchored either directly upon the disc or plate 8 or suitably upon the cover 14 (FIG. 5). The spiral condition of the spring 20 is so selected that the housing 17 always is returned into a rest position thereby in which a projection 21 formed by the housing engages against a fixed abutment 22 on the bracket 2 (FIG. 1).

Figure 6:
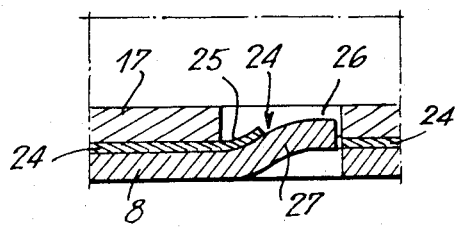

The middle portion of the housing 17 is preferably unified with a metal dish portion or bowl 23 (FIG. 6) which in equal angular spacing has depressions 24 provided therewith from which for instance three of the same are provided and of which each forms a bent edge or periphery 25 which engages into the inside of a recess means 26 in the housing 17. The bent edges 25 of the depressions 24 cooperate with running surfaces 27 which are provided in the middle part of the disc 8 offset to the same side as the ring-formed bearing surface 9. As can be seen from FIG. 6, the running surfaces 27 can be stamped out of the plate or disc 8 so that they simultaneously form abutments embodied in their face-separating surfaces engageable against the corresponding edges of the recess means 26 in the housing 17 under return force effectiveness of the spiral spring 20. Such an embodiment then permits elimination of the projection 21 and the abutment 22 which were described previously.

The second end part of the axis or shaft 6 forms essentially a linkage -semi-spherical portion 29 which on the other hand lies against the outer surface of the bracket 1. The linkage-semispherical portion 29 forms a bearing seat of a swinging or pivotal disc 30 of which the position is changeable and which upon its periphery carries the same number of teeth 31 as the number of teeth corresponds to the number of holes 6 in which these teeth usually engage.

In the position illustrated in FIGS. 1 to 3, the bolts 11a through 11c taken into actuation penetrate into the holes 7 and 6 under effectiveness of the springs means 13 and accordingly press the corresponding teeth 31 of the pivotal disc 30 back so that these are pressed upon the linkage semi-spherical portion 29 in such a manner that the axis or shaft 16 is loaded in a direction in which the housing 17 is supported or engaged by way of the bowl 23 upon the disc 8. The bolts 11 brought into actuation engage partially in the hole 7 under effectiveness of the spring means 13 while the bolts 11 not taken into actuation engage in axial direction in those parts of the bracket 1 which correspondingly cover holes 7. Consequently the teeth 31 of the disc 30 completely engage into the corresponding holes 6 of the bracket so far as these diametrically oppositely are located across from the holes into which the bolts engage that have become effective.

Figure 7:
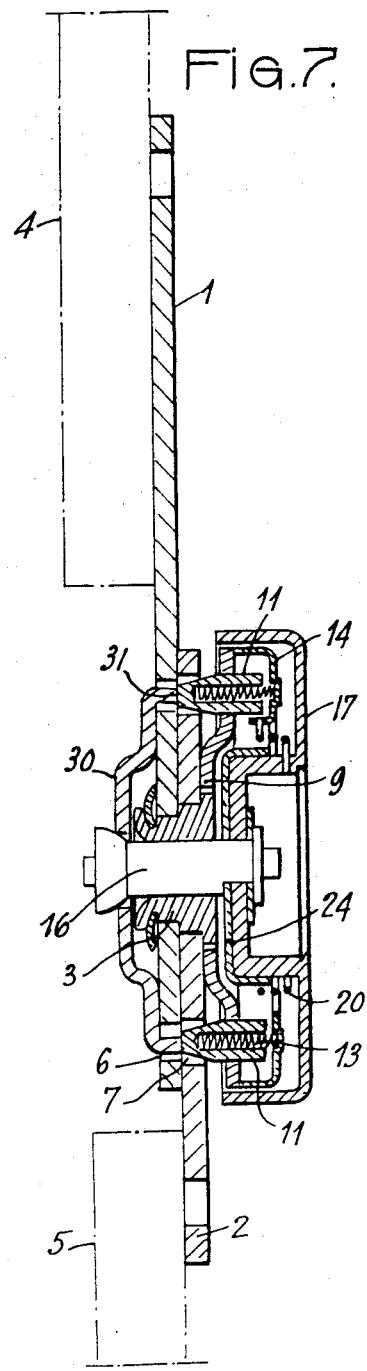
FIG. 7 is a view similar to FIG. 2 showing the linkage in a differing characterizing effective position of the parts.

The linkage described above operates as follows:

When the inclination adjustment of the back rest carrier is to be changed then one using the same actuates the finger 19 in the sense of the arrow $f_1$ until the housing 17 is so far pivoted or swung that the edges 25 of the bowl 23 engage upon the running surfaces 27 and thus bring about the actual axial shifting of the housing 17. The swinging or pivoting is limited by way of the abutment 28 so that there is avoided that the one using the same without wanting to can ever pivot or swing the housing 17 so far that the recess means 26 would become moved by an amount corresponding to their angular spacing and consequently the housing would be moved back into the latched position illustrated in FIG. 2. The axis or shaft 16 takes part in the same sense with the axial shifting of the housing 17 in the direction of an arrow $f_2$ which accordingly returns the pivotal disc 30 into the engaging position upon the bracket 1 (FIG. 7). In this position, all teeth or tooth means 31 engage completely in the holes 6 so that the bolts taken into actuation, for instance the bolts 11a through 11c are pressed back against the effectiveness of the corresponding spring means 13 in the holes 7. The bolts 11 consequently release the bracket 1 so that the same in its angular position relative to the bracket 2 is adjusted by a desired amount and the back rest carrier can be inclined corresponding to the desire of the one using the same.

When the desired position is attained, then the user releases the finger 19 so that the spiral spring 20 takes the housing 17 into its original position. Whatever the desired new position may be, always there are certain holes 6 at least partially with the holes 7 anew so that the corresponding bolts 11 become effective under loading by way of the springs 3 and simultaneously penetrate into the holes 7 and the holes 6. Under the effectiveness of the spring means 13, there is then pressing of the differing bolts becoming effective to push the corresponding tooth means 31 of the disc 30 back. The disc 30 then is supported against or engages upon the linkage semi-spherical portion 29 so that the axis or shaft 16 has imparted thereto a shifting in opposite direction which returns the housing 17 into its original position in an opposite direction (opposite to the arrow $f_2$).

As can be ascertained from the foregoing, there is achieved with a nominal angular movement of the housing 17 the release of the linkage for the purpose of changing the inclination of the back rest which can be latched in every angular position between the boundary positions of the steepest upright and complete downward folding thereof whereby in all conceivable positions certain holes 6 at least in part but in sufficient measure cover the corresponding holes 7.

In addition to the foregoing advantages, it is noteworthy that the bolts that have become effective engage in the area of the middle radius thereof upon the edge area of the holes 6 so that always an effective latching of the bracket 1 is attained even in the case of changing force engagement or changing loading in height of the back rest carrier.

The special embodiment of the linkage provides still a further advantage since it suffices to actuate the finger 19 always in the same direction in order to change the inclination of the back rest carrier in the one or in the other direction.

Figure 8:
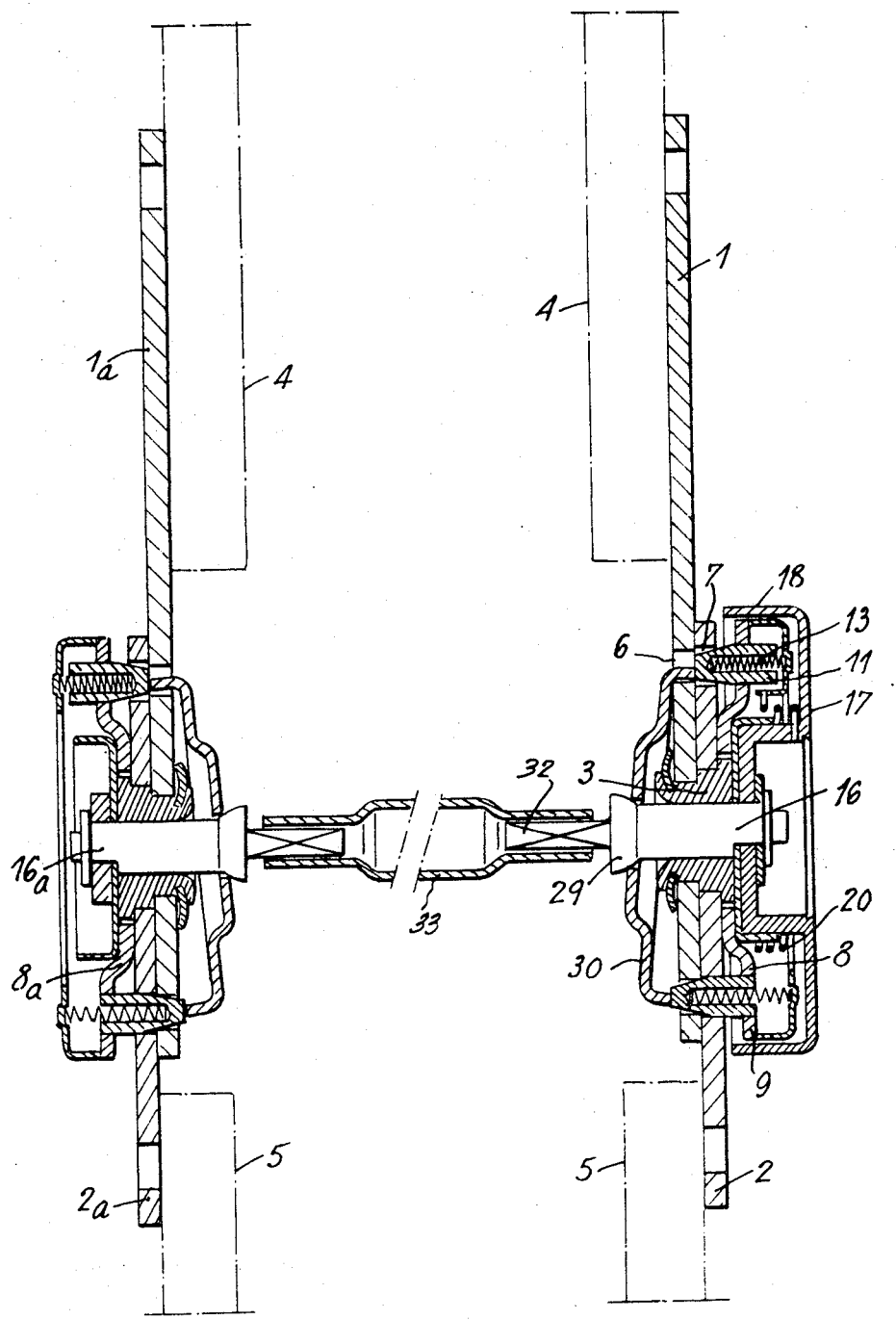
FIG. 8 is a section elevational view of a pair of linkages having features in accordance with the present invention.

FIG. 8 shows an example embodiment with which the back rest carrier is connected with the seat carrier means by way of two identical linkages. In such a case, the axis or shaft 16 of each linkage is extended by way of a four-cornered attachment piece 32 which slidingly fits into a coupling pipe or tube 33. For the purpose of achieving a simultaneous axial shifting of the axis or shaft 16a there are provided running surfaces 27a upon the plate or disc 8a symmetrically arranged with respect to the linkage with the housing 17.

In the modified embodiment according to FIGS. 9 to 12, there is a cover 14 having a peripheral edge 34 with a projection 35 which engages into a depression or recess means 36 in the edge of the planer bearing surface 9. The projection 35 makes it possible to maintain or hold the cover relative to the plate or disc 8 in a particular angular position so that thereby also the position of a kidney-formed window 37 provided in the cover 14 is fixed. The peripheral edge 34 of the cover 14 also provides three slits 38 which have equal spacing from each other and which are embodied for gripping therethrough of wavy-formed recess means 39 of an elastic ring or annular member 40 which under elastic deformation is so installed that the same surrounds the peripheral edge 34 of the cover 14 in a sealing manner. The recess means 39 additionally have the purpose that they hold or maintain the cover 14 in an axial position upon the plate or disc 8 against the effective pressure of differing spring means 13 after passage through the slits 38 so as to engage below the planar bearing surface 9 of the plate or disc 8.

Transverse through the cover 14 there is the pipe or tubular-formed extension 41 of a housing 42 which forms a peripheral wall surrounding an edge 34 of the cover 14. The tubular-formed extension 41 forms a cylindrical bearing surface 44 lying concentrically with respect to the bearing sleeve 3; on each side of the bearing sleeve the same carries a holding piece 45. This holding piece 45 engages upon a disc 46 placed thereunder which is arranged upon one of the holes 6 of the bracket 1 covered by closure cap 47. That part of the extension 41 of the housing 42 which traverses between the disc 8 and the cover 14 forming boundary for the chamber therewith forms a four-cornered bearing part 49 upon which a cam 50 is installed. The end surface of the latter directed toward the bearing sleeve 3 provides three projections 51 (FIGS. 15, 16) arranged in equal spacing from each other which each has a planar parting surface 52 of which each has two running surfaces 53 and 54 proceeding therefrom which transfer into running surfaces 53, respectively 54 of the neighboring projections. The projections 51 providing equal spacing among each other form surfaces for the side shifting of a pivotal or swinging disc 55 relative to the bracket 2. The swinging disc 55 on its periphery provides cutouts or recesses 56 (FIGS. 17 and 18) which lie generally below head shoulders 57 formed underneath the bolts 11. The pivotal disc 55 is placed loosely with a center opening 58 upon the bearing part 49. The middle opening 58 is surrounded by a ring area or annular means 59 which is bowed out into depressions or hollow portions 60 and 61 lying out of the plane in which the pivotal disc is located alternately in substantially the same amount extending in the one and in the other side thereof. The depressions or hollow portions 60 are embodied to fit complementary to the projections 51 so that these as do the latter have planar parting surfaces 62 from which to and fro running surfaces 63 and 64 proceed which correspondingly belong to the neighboring or adjoining depressions or hollow portions 61. The pivotal disc 55 is so installed that the depressions or hollow portions 60 and 61 extend in the same direction as the projections and depressions of the cam 50 so that the same are exactly complementary and interfit accurately with each other (FIG. 9). When a user wants to change the inclination adjustment of the back rest carrier, there must be rotation of the housing 42 for instance by means of a lever 66 in the direction of arrow $f_2$. Upon the turning of the housing 42 there is rotation of the cam 50. The cam 50 accordingly is effective by way of the to and fro running surfaces 54 of the projections 51 as shifting elements together with the corresponding to and fro running surfaces of the depressions or hollow portions 61 and 62 of the area or portion 59 which brings about shifting of the pivotal disc 55 transverse to the bracket 2 and in axial direction with respect to the extension 51 so that the pivotal disc is brought into a position in which the same against the effectiveness of the spring means 13 forcibly brings about the return of those bolts 11 which previously engage simultaneously into the holes 7 and 6. The bracket 1 is accordingly released for the angle adjustment relative to the bracket 2 so that the same can be swung by a desired amount into a setting of the inclination of the back rest carrier corresponding to the desire of the user. After the adjusting or setting, the user releases the housing 42 which under effectiveness of the spring means 13 upon those bolts permits engagement or penetration anew into the hole 6 and 7 at least partially covered being returned in direction toward the original position thereof. Hereby the bolts taken into actuation are effective upon the disc 55 with the heads 57 of the bolts. The inclined surface means 63 thereof engage upon the corresponding surfaces of the cam 50 which is displaced in a direction opposite to that of the arrow $f_2$ and which takes along the housing 42 in the same rotational direction.

In order to attain a proper manner of operation as described in the foregoing, there must be maintained a particular relationship between the angle opening of the window 37 and the spacing between the parting means of two adjoining projections of the cam 50. For this purpose, in any event, one must take into consideration in all cases that the angular adjustment of the housing must be limited over a particular range in such a way that in no case can they parting means 62 of the depressions can be moved beyond the planar parting surfaces 52 of the cam, so that the housing 42 automatically would return into the original position. It is additionally apparently necessary to designate the amplitude or height of the depressions of the cams 50 in dependence upon the ring-formed engaging surface of the housing 42 such that one obtains a relative movement of the disc 55 which suffices in order to bring about bolts 11 out of engagement as the same are actuated and engageable with holes 6 and 7 corresponding thereto.

A linkage embodied according to this modification is characterized thereby that all the components thereof are arranged upon one and the same side of the bracket 2 so that the space requirement in transverse direction is reduced beginning from the free surface of the bracket 1 upon the smallest amount. Herefrom there follows that the linkage can be installed with all types of seats without special changes or modifications or enclosures surrounding the same being necessary. Additionally, this particular embodiment permits simplification of the operating steps in a measure not to be underestimated upon utilization and during assembly of the linkage in the manufacturing stage thereof.

The modified embodiment illustrated in FIG. 19 provides for replacement of the bracket 1 by way of a metal profile means 67 which is thinner than the bracket. In order to provide sufficient mechanical resistance capability as to the end parts of the profile means 67 cooperating with the bracket 2 there is provided addition of a reinforcement means for instance a plate 68 welded thereto which at the same diameter has hole 6a of the profile means 67 as the hole 6 previously noted.

With the sample embodiments, both described in the foregoing, there is noted that the tubular-formed extension 41 of the housing 42 is embodied with a hollow space or chamber means 69 from a four-cornered cross section for receiving a transfer or transitional fitting piece 70 of a tube or pipe or of a rod 71 which respectively serves for transmitting movement and for coupling with the second linkage with which the vehicle seat is equipped. In order to achieve the simultaneous operation of the linkages, there is formation and provision of a mirror image or identical relationship as to the details of the cam 50 and disc 55.

Features of the present invention cannot be considered as restricted to the illustrated and detailed sample embodiments described; differing modifications can be undertaken without departing from the scope of protection of the present invention.

What I claim is:

1. Articulated linkage for adjusting a seat back rest especially for motor vehicles comprising: two bearing brackets provided on a bearing sleeve and having holes therewith in circular rows upon equal diameters, the rows of holes relative to each other providing a difference therebetween of at least one hole, bolt means carried by the bearing brackets, a disc axially slidable relative to said bolts, a rotatable housing that covers the bolts, loose pivotal disc means and running-off surfaces operable together with said rotatable housing with a lateral shifting thereof, said running-off surfaces and loose pivotal disc means being provided to effect a return guidance of said bolts, and elastic elements for each individual bolt provided therewith in those holes engaged by the two bearing brackets covered in sufficient measure so that the heads of the bolts can be received thereby.

2. Articulated linkage according to claim 1, wherein one bearing bracket provides a larger number of holes than would correspond to the number of holes in the other bearing bracket, a disc secured to the bearing bracket having the larger number of holes and the axially slidable shiftable bolts including one complementary to holes of the bearing bracket with the smaller number of holes.

3. Articulated linkage according to claim 2, in which said disc and a cover are unified, spring means having a supporting surface formed by said cover, said springs pressing upon bolt means axially shiftable and sliding variously in the corresponding holes of the bearing bracket having the smaller number of holes.

4. Articulated linkage according to claim 3, in which the bearing brackets are secured side to side upon the bearing sleeve in which a pulling axle is slidably guided and has one end thereof carrying said disc surrounding rotatable housing, and the other end of which forms a bearing and an abutment for the swinging disc representing linkage half sphere of which the position can change, tooth means provided on the peripheral edge thereof and provided in an equal number as the number of holes in the bearing bracket having the larger number of holes and from which certain tooth means always engage in those corresponding holes of the bearing bracket having the larger number of holes which lie diametrically opposite thereto and which correspond with the holes of the other bearing bracket having the smaller number of holes correspondingly for receiving the heads thereof and in a sufficient manner at least partially covering slidably guided bolts therewith.

5. Articulated linkage according to claim 4, in which the rotatable housing has recesses in equal angular spacing in a middle planar part thereof and which usually effect an opposing action and/or a transverse shifting being effected upon running surfaces located across therefrom which are offset from the disc as cut out and projecting toward the bearing bracket direction.

6. Articulated linkage according to claim 5, in which the rotatable housing forms a ring chamber with the disc and cover, the ring chamber having a spiral spring therein of which one end part is secured to the disc and the other end part of the spiral spring is secured to said housing, and a fastening finger for actuation provided on said housing in an essentially radial direction.

7. Articulated linkage according to claim 6, in which a rigid abutment is provided between one bearing bracket and the rotatable housing, said abutment providing limitation of the turning range of the rotatable housing corresponding to the effective angular spacing of the running surface.

8. Articulated linkage according to claim 7, in which the axially slidable shiftable bolt means each have a head portion spherically blunted of which the middle diameter substantially equals the diameter of a transitional range between cylindrical and spherically blunted portion thereof which together form each hole of a bearing bracket in complementary relationship.

9. Articulated linkage according to claim 1, in which the disc carries a cover which is secured in an angular position and according to an axial position whereby the disc guides the sliding shiftable bolts which have cutouts upon the periphery of the swinging disc engaging head shoulder means whereby the swinging disc is arranged internally in a chamber having boundaries defined by way of the disc and the cover, and a driving housing means connected therewith internally thereof.

10. Articulated linkage according to claim 9, in which a rotatable housing is the driving element means which provides a pipe-formed axial extension providing a bearing part of four-cornered cross section behind a cylindrical bearing portion centered in the bearing sleeve, and cam means fitted upon the four-cornered cross section with several equal angled projections provided thereby which operate together with recess means complementary as formed by inclined surfaces upon the swinging disc which has cuts in the periphery thereof providing space for receiving the head shoulders of the bolt means.

11. Articulated linkage according to claim 10, in which the swinging disc is received in the ring chamber having boundary thereof defined internally by the disc and cover, said cover being secured to said disc and being surrounded by a housing which forms internally a rigid protrusion that extends through an arc-formed window in the cover and accordingly determines the angular range of the part turning of said housing.

12. Articulated linkage according to claim 11, in which the swinging disc has depressions arranged in equal angular spacing and fitting projections of cam means within the ring range which surround a middle opening that permits projection therethrough by a six-edged bearing part of said housing.

13. Articulated linkage according to claim 12, in which the cover provides a peripheral edge which surrounds the disc upon which the cover on the one hand is secured in its angular position by means of a recess of the disc engaging a projection and on the other hand is secured in axial direction by means of an elastic ring which is so embodied that certain segments thereof engage through the peripheral edge therebeyond below the disc.

* * * * *